June 19, 1934.  H. DECKEL ET AL  1,963,324
CAMERA SHUTTER
Filed Jan. 2, 1932   3 Sheets-Sheet 1

Inventors
Hans Deckel
Michael Burger
By Edward H. Cumpston
their Attorney

June 19, 1934.  H. DECKEL ET AL  1,963,324
CAMERA SHUTTER
Filed Jan. 2, 1932    3 Sheets-Sheet 2

Inventors
Hans Deckel
Michael Burger
By Edward H. Cumpston
their Attorney

June 19, 1934.   H. DECKEL ET AL   1,963,324
CAMERA SHUTTER
Filed Jan. 2, 1932   3 Sheets-Sheet 3

Inventors
Hans Deckel
Michael Burger
By Edward H. Cumpston
their Attorney

Patented June 19, 1934

1,963,324

UNITED STATES PATENT OFFICE 1,963,324

CAMERA SHUTTER

Hans Deckel, Solln, near Munich, and Michael Burger, Munich, Germany, assignors to firm Friedrich Deckel Präsisionsmechanik und Maschinenbau, Munich, Germany Application January 2, 1932, Serial No. 584,426
In Germany December 19, 1930

32 Claims. (Cl. 95—63)

The object of the present invention is to provide a camera shutter in which the shortest times of exposure obtainable with all hitherto known commercially practical shutters is reduced by a considerable amount. The invention relates both to "automatic" shutters which are set and instantaneously tripped by the same operation, and to "set" shutters which can be set and remain for any desired length of time in the "set" position and separately tripped voluntarily by the operator.

Fig. 9 is a similar view of a shutter of the "automatic" type.

In all hitherto known "automatic" camera shutters the shortest possible time of exposure is 1/125 of a second.

Figure 1:
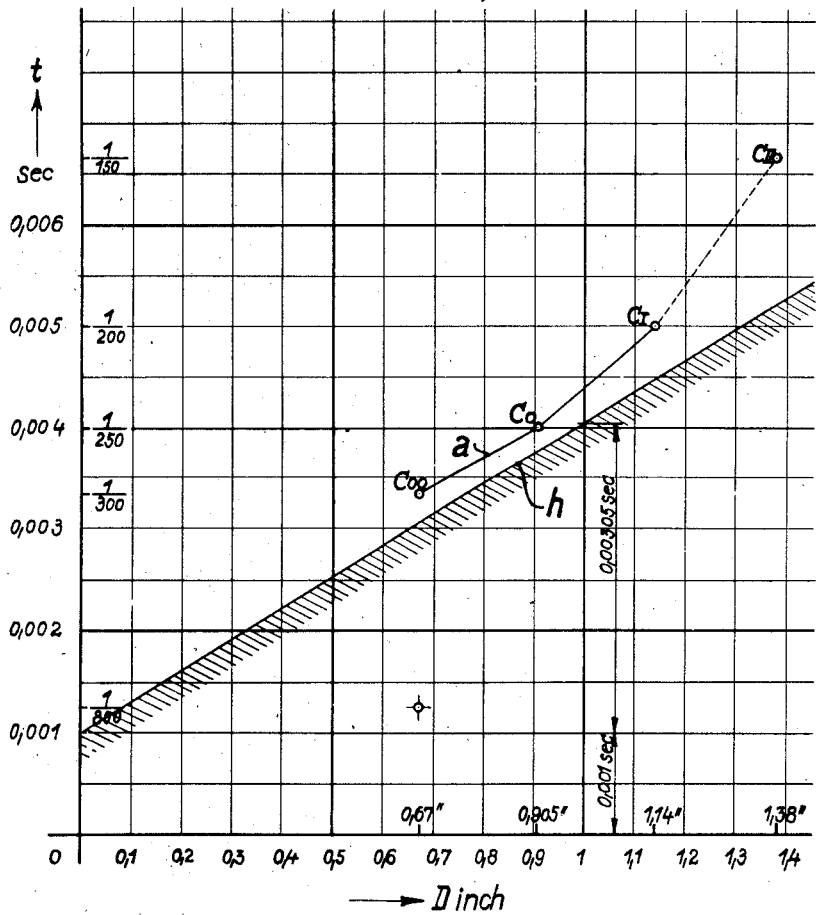
Fig. 1 is a diagram illustrating minimum shutter speeds in seconds with respect to the diameter of the shutter aperture in inches.

In all hitherto known commercially practical "set" shutters the shortest possible exposures are shown, on the appended diagram (Fig. 1) by the line $a$, in relation to the aperture of the shutter. For example, with aperture diameters of 0.67 inch (17 mm.) and 0.905 and 1.14 inch (23 and 29 mm.) respectively the shortest hitherto possible exposures are 1/300 and 1/250 and 1/200 of a second respectively.

Figure 2:
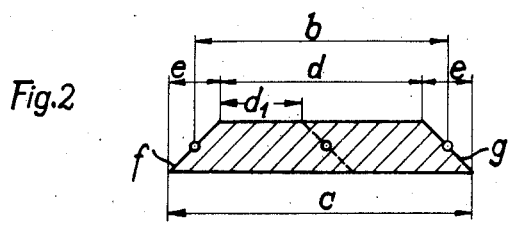
Fig. 2 is an exposure diagram of a shutter.

These times, according to the method of measurement in use to-day, are found from the middle length of the exposure diagram (Fig. 2) which is determined by the length of the diagram measured at half height. In Fig. 2, this middle length is denoted by the distance $b$, the distance $c$ represents the total duration of the exposure, the distance $d$ indicates the time during which the shutter opening remains at its maximum value and projections $e$, of the lines $f$ and $g$, denote the times during which the shutter blades proper perform the movement of opening or closing.

In the existing constructions a further increase of the speed of the shutter could be theoretically obtained by correspondingly increasing the driving power. This method is not practically feasible because on increasing the speed the necessary driving power would have to be increased as the square of the speed, and any substantial increase of the driving power hitherto used would impair the manipulation of the shutter.

In this invention, however, an increase of the shutter speed is made possible by decreasing the total moment of inertia of the moving parts. In all hitherto known shutters, the total inertia of the shutter blades and other moving parts is detrimentally great because the importance of these conditions has not been previously recognized. It is true that shutter blades having rather small moments of inertia have been used but the other moving parts, which have a considerable mass, have been made with unnecessarily great moments of inertia. The construction of a shutter having higher speeds than those heretofore secured with a given driving force is only possible if the sum of the moments of inertia of the driven parts is taken into account.

In a known "set" shutter, the speediest on the market (Compur 0.67" (17 mm.) aperture) having three shutter blades, the moments of inertia of the blades is $173.3 \times 10^{-4}$ cm.g.sec.$^2$, the moment of inertia of the blade ring $$29.2 \times 10^{-4} \text{ cm.g.sec.}^2,$$

consequently the sum of the moments of inertia is $202.5 \times 10^{-4}$ cm.g.sec.$^2$. The shortest time of exposure obtainable with this shutter is 1/300th of a second.

One of the fastest known "automatic" shutters (0.905 inch (23 mm.) aperture) has three blades, the moment of inertia of which is $$481 \times 10^{-4} \text{ cm.g.sec.}^2$$

the moment of inertia of the blade ring is $51.0 \times 10^{-4}$ cm.g.sec.$^2$ and the total moment of inertia is $532 \times 10^{-4}$ cm.g.sec.$^2$. The shortest exposure obtainable with this shutter is said to be 1/125th of a second.

In this invention, the sum of the moments of inertia of all the movable parts is made so small that with "automatic" shutters exposures of 1/150 sec. and with "set" shutters exposures of 0.00305.D+0.001 sec. are obtained without difficulty. The equation given for "set" shutters is the equation of the straight line $h$ in Fig. 1 where D denotes the diameter of the shutter opening in inches. The line $h$, like the line $a$, represents the times of exposure in relation to the diameters of the shutter apertures; it lies below the line $a$ and indicates the upper limit of an area within which the shortest exposures attainable by the improved shutter of the present invention lie.

A reduction of the moment of inertia of the shutter blades can be obtained by using thin material for the blades, by shifting the blade bearings close to the edge of the objective opening and by choosing a form of each individual blade such that its moment of inertia relatively to the axis of rotation is small.

The moment of inertia of the blade actuating member, which generally is the largest of the driven parts, may be decreased by decreasing the mass of the member and its radius of inertia. By the use of high grade material the dimensions of this member, and consequently its mass, may be decreased and by placing the member close to the objective tube its radius of inertia may be decreased.

In this invention certain elastic members are used to reduce the maximum value of the force transmitted by them which allows a further dimensional reduction of all moving parts. Certain intermediate members which reduce the surface pressure exerted upon the blades, are also introduced between the shutter blades and the blade actuating member which makes possible the use of a thinner and lighter blade than has been heretofore possible.

A further possibility of reducing the time of exposure results if the shutter is so constructed that on opening or closing the blades, the driving parts set in motion by the source of power of the shutter transmit their kinetic energy to the driven parts by impact so that the driven parts after the impact move at higher speed than the driving members. It is to further advantage, in order to shorten the time of exposure, to automatically convert the opening movement of the sectors into their closing movement by providing in the housing one or more hard stops from which the blades or the members driving them will rebound in the same manner in which a hammer rebounds when struck on an anvil.

As the modern camera shutter must produce automatically short, medium and long exposures (up to one and two seconds), the member withholds the blades in the maximum open position (according to the line $d$ in Fig. 2) must have a definite form in order to permit the retarding mechanism, which actuates this member, to function properly. In all hitherto known shutters the form and type of action of this member is invariable.

In this invention, in order to obtain particularly short exposures, both the form and type of action of this member are made variable so that the time during which the blades are held in the maximum open position can be varied, with other conditions remaining equal. If this member is so arranged that by its action it keeps the blades open, the form of the member may be varied which is suitably done by bringing into action a supplementary member. The introduction into or withdrawal from action of this supplementary member may be accomplished directly by a cam, by tensioning an additional spring by another cam or by a separate mechanism. In the first two of these cases the cam may be a part of the setting disc of the shutter. It is an advantage to use as the additional spring a helical spring wound with initial internal tension, because such a spring on increase of its length immediately gives off a powerful and uniform force.

The additional spring is suitably fixed to a hinged lever which is so mounted that the spring when put under tension and in the tensioned state exerts no force, or only a very small force, of displacement on the setting disc of the shutter.

Specific embodiments of shutters constructed in accordance with the present invention will now be described with reference to Figs. 3 to 8 inclusive of the drawings.

Figure 3:
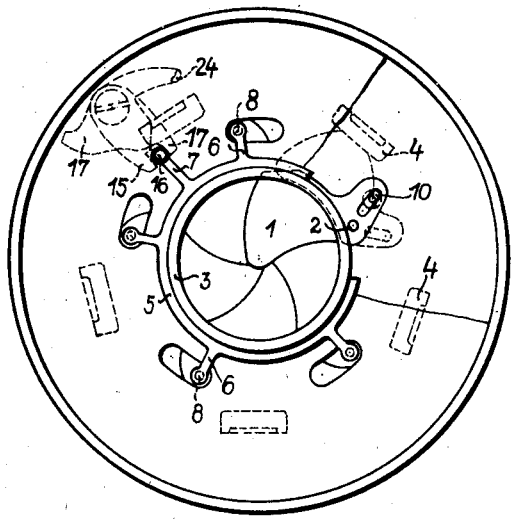
Fig. 3 is a drawing of a shutter constructed according to a preferred embodiment of the present invention with parts removed and parts omitted, illustrating especially the shutter blades and the blade operating ring.
Figure 4:
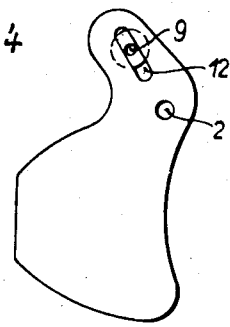
Fig. 4 is an enlarged view of a shutter blade.
Figure 5:
Fig. 5 is a perspective view on an enlarged scale of an intermediate member for operating a shutter blade.
Figure 6:
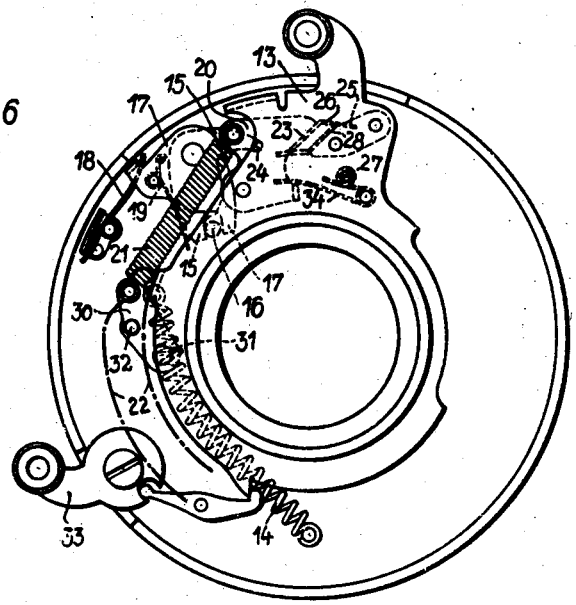
Fig. 6 is a view of certain parts of a shutter of the "set" type, constructed in accordance with a preferred embodiment of the invention, illustrating the master member of the shutter in set position ready to be released for making an exposure of medium or long duration.
Figure 7:
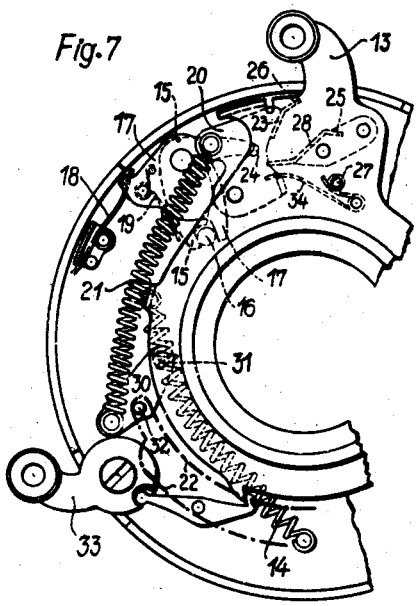
Fig. 7 is a similar view with the parts in a position for making an exposure of short duration.

The shutter illustrated in Figs. 6 and 7 has five blades shown in Fig. 3 in the closed position.

The open position is indicated in Fig. 3 by the blade shown in dotted lines.

The blades are made, for example, of sheet steel or ebonite the thickness being as small as possible. The lowest limit for steel blades is approximately 0.001 to 0.003 inches (0.03 to 0.08 mm.) and for ebonite blades 0.004 to 0.012 inches (0.1 to 0.3 mm.). The bearing 2 of the blades is near the edge of the light aperture, that is near the objective tube 3. In the housing hard stops 4 are provided from which the blades after reaching their maximum open position are allowed to rebound. The blades are so shaped that they have a large surface in contact with the stops, thus reducing the strain. The blade ring 5 rotates in the usual way around the objective tube. It is made preferably of hardened steel or other material of great strength, which permits of keeping the dimensions of the ring as small as possible and approximating its external diameter as far as possible to the external diameter of the objective tube 3. The blade ring has arms 6 which are so constructed that an elastic spring action can take place in the process of movement and the impact of the actuating member is transmitted gently to the blades 1. The blade ring 5 is driven by the elastic arm 7. The arms 6 carry pins 8 which are inserted in holes 9 of the sliding members 10. The sliding faces of the members 10 are in contact with the edges of the slot shaped openings 12 of the blades and transmit the pressure from the pins 8 to these edges. In this way the surface of contact between the pin and blade is greatly increased and the pressure on the contact surfaces of the blades is so reduced that blades of the thinnest construction are not damaged even by the largest accelerating forces.

In Figs. 6 and 7 the tension lever 13 and the main spring 14 are shown in the position of tension. A bell crank lever 15 engages, by its recess, a pin 16, carried by the spring arm 7 of the blade ring, and moves this pin in the proper direction to open the blade. A lever 17 is in contact with the opposite side of the pin 16 and light springs 18 and 19 keep the levers 15 and 17 in their neutral position. On the lever 13 a supplementary piece 20 is turnably arranged which carries one end of the additional spring 21 which is made as a helical spring under tensile stress and is wound so as to have an initial internal tension. By "initial internal tension" is meant a spring wound so as to have a constant tendency to hold the coils of the spring in close contact with each other with considerable force, when no external displacing force is employed. Such a spring exhibits considerable resistance to any elongation even in the initial stages of such elongation, whereas a spring of the ordinary type, without initial internal tension, has very little resistance to elongation until it has been elongated to a substantial extent. The other end of this spring is fixed to a lever 30 which can rotate about the pin 31 and carries a pin 32. The pin 32 moves in a recess 22, shown in dot and dash lines, which recess is cut in the setting disc of the shutter. If, as illustrated in Fig. 6, the shutter is set for medium or long exposure, the pin 32 is in the wide part of the recess 22 and can move freely. Owing to this the member 20 remains in its neutral position even with the lever 13 in the "set" position. After the release of the shutter by the finger lever 33, when the lever 13 returns to its neutral position, the inclined surface 23 of the member 20 strikes against a nose 24 of the bell crank lever 15 and moves the latter outward and thus opens the shutter. After the nose 24 has slipped off the end of the surface 25, which lies against the surface 26 which surface is parallel to the direction of movement, the blades are closed again by the impact of a projection 27 of the lever 13 against the lever 17. Between the beginning of the downward movement of the lever 13 and the impact of the sloping surface 23 of the member 20 against the nose 24, a certain time elapses within which the driving parts 13 and 23 attain a high velocity, so that they can transmit their energy by impact to the driven parts.

If, as shown in Fig. 7, the shutter is set for a short time of exposure the pin 32 is held in its position of rest by a narrow part of the recess 22 so that the spring 21 is placed under tension at the same time as the tension lever. The lever 30 is so arranged that the pressure of the pin 32 is directed say radially outward and exerts no displacing effect on the setting disc. The spring 21 now overcomes the power of the spring 34 and swings the member 20 outward. In this way the nose 24 can pass through below the sloping surface 23 and strike against the sloping surface 28 provided on the lever 13 which now only produces the opening movement of the blades. After the nose 24 slides from the end of the surface 25 the blades are, just as described above, closed by the impact of the projection 27 against the lever 17. It is thus insured that the path or the time which is available for acceleration of the driving parts is still further increased and there is furthermore a reduction of the exposure by diminution of the duration of full opening (see Fig. 2 line $d_1$).

On setting the shutter the blades are, as usual, not moved; in so doing the nose 24 slides along the back of the surface 28.

The shutter described by way of example with the aid of Figs. 3 to 7 inclusive is constructed with 5 blades and an objective aperture of 0.67" (17 mm.). The moment of inertia of the 5 blades is $22.7 \times 10^{-4}$ cm.g.sec.$^2$ and that of the blade ring is $7.7 \times 10^{-4}$ cm.g.sec.$^2$. The sum of the moments of inertia is therefore $30.4.10^{-4}$ cm.g.sec.$^2$. With this shutter exposures of 1/800th of a second can be obtained.

Figure 8:
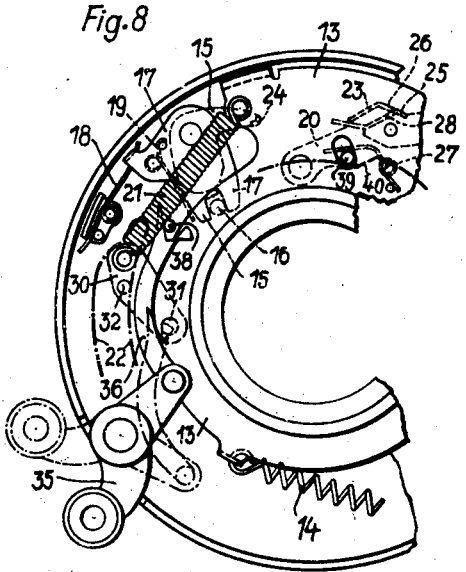

In Fig. 8 a constructional example of an "automatic" shutter is shown which is arranged similarly to the "set" shutter described above. With the shutter illustrated only one finger lever 35 is provided for setting and tripping the shutter which lever by means of a connecting rod 36 turns the tension ring 13 clockwise and releases it when the end of the connecting rod 36 is pressed aside by the pin 38. The arrangement of the additional spring is in principle the same as in the example shown in Figs. 6 and 7 but here a somewhat different form of construction is shown, the additional spring being attached not to the member 20 but to the tension ring 13. The member 20 here carries a pin 39 which is directly acted upon by a cam 40 which is a part of the setting disc. This arrangement can of course also be used in a "set" shutter just as the arrangement of Figs. 6 and 7 can be employed in an "automatic" shutter.

What we claim as our invention and desire to secure by Letters Patent of the United States is:—

1. A photographic shutter comprising one or more movable blades having relatively low moments of inertia, driving means, and a blade operating member driven by said driving means for operating said blades, said blade operating member being formed of material of great strength and small dimensions and having a relatively low moment of inertia, so that said shutter blades may be operated at high speed by driving means of ordinary power.

2. A photographic shutter comprising means defining an exposure aperture, shutter blades mounted for oscillation about axes in close proximity to the edge of said aperture and having portions extending outwardly beyond said axes, a relatively thin and narrow blade ring extending around said aperture in close proximity to the edge thereof and having outwardly extending projections for cooperation with said outwardly extending portions of said blades, and means for driving said blade ring to open and close said shutter blades.

3. A photographic shutter comprising means defining an exposure aperture, shutter blades mounted for oscillation about axes in close proximity to the edge of said aperture and having portions extending outwardly beyond said axes, said outwardly extending portions having relatively low moments of inertia, a thin and narrow blade ring extending around said aperture in close proximity to the edge thereof and having outwardly extending projections for cooperation with said outwardly extending portions of said blades, said blade ring being formed of strong material shaped to have a relatively low moment of inertia, and means for driving said blade ring to open and close said shutter blades.

4. A photographic shutter comprising a plurality of movable shutter blades, elastic means for moving said shutter blades, and impact means for driving said elastic means to open and close the shutter blades.

5. A photographic shutter comprising a plurality of movable shutter blades, driving means causing an impact, and elastic means operatively interposed between said driving means and said shutter blades to receive an impact from said driving means and to transmit it to said blades without injuring the blades.

6. A photographic shutter comprising a plurality of movable shutter blades, a blade operating member operatively connected to said blades and having an elastic portion, and means for transmitting force to said elastic portion to move said member to shift said blades.

7. A photographic shutter comprising a plurality of movable shutter blades, a blade operating member having a plurality of elastic portions each operatively connected to one of said blades, and means for transmitting force to said member to move it and through said elastic portions to shift said blades.

8. A photographic shutter comprising a plurality of movable shutter blades, mechanism for shifting said blades from closed to open position, and fixed abutment means cooperating with at least certain of said blades in their open positions so that said blades will strike said abutment means during their opening movements and tend to rebound therefrom toward their closed positions.

9. A photographic shutter comprising a plurality of movable shutter blades, mechanism for shifting said blades from closed to open position, and abutment means in position to be struck by said blades substantially at the completion of their opening movements so that said blades tend to rebound from said abutment means, said blades and abutment means having cooperating contacting surfaces of complementary shape providing relatively large areas of contact.

10. A photographic shutter comprising a shutter blade mounted for movement, said blade having a slot therein, a slide member mounted for sliding movement in said slot, and a blade operating member pivotally connected to said slide member.

11. A photographic shutter comprising a shutter blade mounted for movement, said blade having a slot therein, a slide member mounted for sliding movement in said slot and having a bearing of substantial area on the edges of said slot, and a blade operating member pivotally connected to said slide member.

12. A photographic shutter comprising a shutter blade mounted for pivotal movement about an axis, said blade having therein a slot having a portion spaced from said axis, a slide member thicker than said blade mounted for sliding movement in said slot and having edges contacting with the edges of said slot throughout a substantial portion of the length thereof, and means for transmitting force to said slide member to move said shutter blade.

13. A photographic shutter comprising a shutter blade mounted for pivotal movement about an axis, said blade having therein a slot having a portion spaced from said axis, a slide member thicker than said blade mounted for sliding movement in said solt and having edges contacting with the edges of said slot throughout a substantial portion of the length thereof, and a blade operating member pivotally connected to said slide member to transmit force thereto for moving said shutter blade.

14. A photographic shutter comprising a plurality of shutter blades, movable operating means effective to open said blades and to hold said blades in open position during a predetermined part of the path of movement of said operating means, and means for varying the extent of said part of the path of movement which is effective to hold the blades in open position.

15. A photographic shutter comprising a shutter blade, operating means including a cam surface having a portion effective to open said blade and another portion effective to hold said blade open, and means for varying the effective length of the portion of the cam surface which is effective to hold the blade open.

16. A photographic shutter comprising a shutter blade, operating means including a cam surface having a portion effective to open said blade and another portion effective to hold said blade open, and means for varying the effective position of the portion of the cam surface which is effective to open said blade.

17. A photographic shutter comprising a shutter blade, operating means including a cam surface having a portion effective to open said blade and another portion effective to hold said blade open, and means for varying the effective position of the portion of the cam surface which is effective to open said blade and the effective length of the portion of the cam surface which is effective to hold the blade open.

18. A photographic shutter comprising a shutter blade, operating means including a master member movable in one direction to operate said blade, said master member having associated therewith a cam surface having a portion effective to open said blade when the master member reaches a predetermined position in its movement and a portion effective thereafter to hold said blade open during a predetermined extent of movement of the master member, and a supplementary member movable into cooperative relation to said cam surface in advance of the blade opening portion thereof, said supplementary member providing a cam surface for opening said blade at an earlier point in the movement of the master member and being effective to extend the effective length of the blade holding portion of the cam surface to hold the blade open during a longer extent of movement of the master member.

19. A photographic shutter comprising a shutter blade, operating means including a movable member effective during part of its movement to hold said shutter blade open, means for varying the extent of the part of the movement of said member which is effective to hold the shutter blade open, and cam means for controlling said varying means.

20. A photographic shutter comprising a shutter blade, operating means including a movable member effective during part of its movement to hold said shutter blade open, a supplementary member movable to and from a predetermined position with respect to said movable member for changing the extent of the part of the movement of said movable member which is effective to hold the shutter blade open, and cam means for controlling said supplementary member.

21. A photographic shutter comprising a shutter blade, operating means including a movable member effective during part of its movement to hold said shutter blade open, a supplementary member movable to and from a predetermined position with respect to said movable member for changing the extent of the part of the movement of said movable member which is effective to hold the shutter blade open, and spring means for changing the position of said supplementary member.

22. A photographic shutter comprising a shutter blade, operating means including a movable member effective during part of its movement to hold said shutter blade open, a supplementary member movable to and from a predetermined position with respect to said movable member for changing the extent of the part of the movement of said movable member which is effective to hold the shutter blade open, spring means for changing the position of said supplementary member, and cam means for controlling said spring means.

23. A photographic shutter comprising shutter blades, means including a spring for operating said shutter blades to make an exposure, and means including a supplementary spring having initial internal tension for operating said shutter blades to make a shorter exposure.

24. A photographic shutter comprising shutter blades, means including a spring for operating said shutter blades to make an exposure, means including a supplementary spring for operating said shutter blades to make a shorter exposure, a lever operatively connected to said supplementary spring and capable of movement to different positions to render said supplementary spring effective or ineffective, a setting disk mounted for oscillation to different positions to control said shutter, and an operative connection between said lever and said setting disk for shifting the lever by movement of the setting disk, said operative connection being formed so that when said lever is in position to render said supplementary spring effective, said operative connection exerts substantially no displacing force tending to oscillate said setting disk.

25. A photographic shutter comprising a plurality of movable shutter blades, elastic means for moving said shutter blades, and driving means for driving said elastic means to open and close the shutter blades.

26. A photographic shutter comprising a plurality of movable shutter blades, an impact means for driving said blades to open and close them.

27. A photographic shutter comprising a plurality of movable shutter blades, driving means, and elastic means operatively interposed between said driving means and said shutter blades to receive force from said driving means and to transmit it to said blades without injuring the blades.

28. A photographic shutter comprising a shutter blade mounted for movement, a slide member mounted for sliding contact with said shutter blade, and a blade operating member pivotally connected to said slide member.

29. A photographic shutter of the automatic type comprising one or more movable blades of relatively low moments of inertia, spring driving means of substantially normal power, and a blade operating member driven by said driving means for operating said blades, said operating member being formed of material of great strength and small dimensions and of relatively low moment of inertia, so that said driving means may operate said shutter to produce an exposure having a mean exposure time as short as 1/150th of a second.

30. A photographic shutter of the set type comprising one or more movable blades of relatively low moments of inertia, spring driving means of substantially normal power, a blade operating member driven by said driving means for operating said blades, means for tensioning said spring driving means, and separate means for releasing said driving means to drive said operating member, said operating member being formed of material of great strength and small dimensions and of relatively low moment of inertia, so that said driving means may operate said shutter to produce an exposure having a mean exposure time as short as 0.00305 second times the diameter of the shutter aperture in inches plus 0.001 second.

31. A photographic shutter comprising a shutter blade, an operating member mounted for oscillation and movable in one direction to produce an exposure and movable in an opposite direction to condition said operating member for an exposure producing movement, a surface associated with said operating member for holding said blade in open position during a predetermined part of said exposure producing movement in exposures of all lengths, an additional surface ineffective during short exposures, and means for moving said additional surface into cooperative relationship with said first named surface for making longer exposures, so that during said longer exposures said two surfaces together will hold said blade in open position during a greater part of said exposure producing movement of said operating member.

32. A photographic shutter having an exposure aperture and comprising a plurality of shutter blades for opening and closing said aperture, an operating member of ring-like form extending around said aperture and mounted for oscillation about an axis within said aperture, transmission means operatively connected to said blades, a surface in fixed position on said operating member for contacting with said transmission means to hold said blades open during a predetermined portion of an operating movement of said operating member, means pivoted on said operating member and having a supplementary surface, and means for shifting said pivoted means from a position in which said supplementary surface is ineffective to contact with said transmission means, to another position in which said supplementary surface forms substantially a continuation of said first named surface, and in which both of said surfaces may contact with said transmission means to hold said blades open during a longer portion of an operating movement of said operating member.

HANS DECKEL.
MICHAEL BURGER.